Patented Apr. 7, 1953

2,634,290

UNITED STATES PATENT OFFICE 2,634,290

ESTERS OF TRICHLOROACETIC ACID

Joseph A. Sonia and Eric H. Scremin, Niagara Falls, N. Y., assignors to Hooker Electrochemical Company, Niagara Falls, N. Y., a corporation of New York No Drawing. Application May 5, 1951, Serial No. 224,826

7 Claims. (Cl. 260—487)

1

This invention relates to new esters of trichloroacetic acid, prepared by reacting trichloroacetic acid with dihydroxy aliphatic alcohols, and more particularly to bis(trichloroacetates) of dihydroxy aliphatic alcohols and dihydroxy ethers having the following general formula:

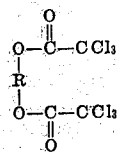

wherein R represents an alkylene or oxyalkylene group having two or more carbon atoms.

This application is a continuation-in-part of our co-pending application S. N. 177,956 filed August 5, 1950.

The novel esters of trichloracetic acid of this invention can be obtained by reacting trichloroacetic acid with an aliphatic glycol or glycol ether, under conditions which effect esterification. Among the dihydroxy aliphatic alcohols which may be used are ethylene glycol, propylene glycol, butane-diol, pentane-diol, hexane-diol, etc.; among the dihydroxy ethers or glycol ethers which may be used are diethylene glycol, triethylene glycol, dipropylene glycol, etc. The new compounds are characterized as being substantially clear water white oils or white crystalline solids, insoluble in water, non-flammable, of mild odor and non-irritating to the skin of man.

The new esters may be prepared by conducting the reaction of the acid component and the dihydroxy aliphatic alcohol, in the presence of a compound which forms an azeotrope with water, preferably with heating whereby high yields of the desired product may be realized; however, the presence of an azeotrope is not essential in this reaction in order to obtain the desired product. Among the compounds which form azeotropes with water which we have found useful in giving good yields of product are toluene, benzene, xylene, pentane, hexane and hydrocarbon materials in general which are immiscible with water.

If desired, a catalyst such as an inorganic acid, e. g. sulphuric acid; acid salt, e. g. sodium acid sulphate; benzene sulphonic acid; p-toluene sulphonic acid, etc., may be employed in the preparation of our novel compounds, to promote rapid reaction at relatively low temperatures, but the reaction proceeds smoothly and rapidly in the absence of such catalysts under the conditions described above.

2

A preferred procedure for preparing the compounds of this invention involves: introducing about two moles of acid component, one mole of dihydroxy aliphatic alcohol and sufficient entrainer (such as toluene, which forms an azeotrope with water, to effect the separation of the water of reaction from the mixture) into an esterification still (which includes a reflux column, means for returning the organics to the reaction vessel and means for separating the water of reaction from the refluxed organics) and refluxing the reaction mixture until substantially no more water of reaction is separated. Upon completion of the reaction, the toluene is distilled from the reaction mixture. The desired product may be recovered in substantially pure form by a simple distillation from the ester still and/or by a washing with water or weak sodium bicarbonate solution in order to remove any unreacted alcohol and/or acid, depending upon the nature of the crude reaction product.

In order to prepare substantially pure esters of this invention, it is not essential that pure trichloroacetic acid be used as the acid component. We have found is convenient and economical to employ the trichloroacetic acid derivative containing trichloracetic acid, trichloroacetic anhydride and trichloroacetyl chloride, produced by the method of our co-pending application, referred to above, as a convenient source of raw material for the acid component. The aliphatic glycols and glycol ethers such as ethylene glycol, diethylene glycol and 1,2-propylene glycol, butane-diol-1,2 etc., which are readily available in commercial quantities are preferably used as the source for the dihydroxy alcohol component in this reaction because of the economy involved.

The novel esters of this invention may also be prepared by other known procedures for preparing esters of the type expressed by the general formula given above, including the simple reaction, with heating, if necessary, of the carboxyl group of the acid component with the hydroxy groups of the alcoholic component whereby water is eliminated, or, by the reaction of the anhydride of the acid component with the hydroxy groups of the alcohol, or, by the reaction of an acid chloride of the acid component, e. g. trichloroacetyl chloride, with the dihydroxy aliphatic alcohol whereby hydrogen chloride is liberated.

The compounds of the present invention can be usefully employed as plasticizers for resins, particularly cellulose resins, e. g. cellulose acetate; as solvents or softening agents; as herbicides and as chemical intermediates in the synthesis of other organic compounds.

The following examples illustrate the preparation of the novel compounds of this invention; however, these examples are not to be construed as limiting our invention.

*Example I.—Ethylene glycol bis(trichloroacetate)*

Seventeen moles (2781.5 grams) of trichloroacetic acid together with 750 grams of toluene and 7.5 moles (465 grams) of ethylene glycol were charged into a five liter glass flask arranged as an esterification still. The esterification still arrangement includes means for heating the reaction vessel, a thermometer, a reflux condenser having cooling means, means for separating the water of reaction from the refluxing organics, and means for returning the organics to the reaction vessel. The charge was heated to a temperature between about 100 and 150 degrees centigrade and refluxed until water of reaction was no longer separated, which was after 15.4 moles (278.7 grams) of water had been removed. The reaction mixture remaining in the esterification still was washed with four separate portions of water. The washed material was then distilled under vacuum; a first cut totaling 750 cc. was separated at a vapor temperature or boiling range of about 41 to 44 degrees centigrade at an absolute pressure between 95 and 72 mm. of mercury; a second cut totaling 80 cc. and containing about 0.22 moles (80.4 grams) of ethylene glycol bis(trichloroacetate) was separated at a boiling range of between 89 and 140 degrees centigrade at an absolute pressure between 72 and 2 mm. of mercury, and a third cut totaling 2467 grams was recovered, boiling at 146 degrees centigrade at an absolute pressure of 2 mm. of mercury, and represented 6.93 moles of ethylene glycol bis(trichloroacetate) which was equivalent to a 92.5 per cent yield of theory of ethylene glycol bis(trichloroacetate) based on the glycol charged. The ethylene glycol bis(trichloroacetate) recovered as the third cut was analyzed and characterized as having the following properties:

| | |
|---|---|
| Per cent chlorine found | 59.95 |
| Per cent chlorine theory | 60.3 |
| Melting point °C | 39.5 |
| Specific gravity at 51° C | 1.592 |
| Boiling point at 2 mm. Hg °C | 146 |
| Appearance, Tan colored crystalline solid. | |

A portion of the tan colored product recovered above, was further purified by washing a molten sample of it with a dilute aqueous solution of sodium bicarbonate and redistilling under vacuum. The melting point of the so purified product was redetermined and found to be 40.3 degrees centigrade.

*Example II*

The foregoing example was repeated on a pilot plant scale employing approximately 54 moles of trichloroacetic acid and 26 moles of ethylene glycol in the presence of toluene as the entrainer. A 95.8 per cent yield of white crystalline ethylene glycol bis(trichloroacetate) melting at 40.1 degrees centigrade was recovered from the initial vacuum distillation step, without employing the added purification step described above.

*Example III.—Diethylene glycol bis-(trichloroacetate)*

In a manner after Example I, seventeen moles of trichloroacetic acid together with 8.0 moles (848 grams) of diethylene glycol and 750 grams of toluene were charged into an esterification still. The charge was refluxed until the formation of water ceased, which was after 17.7 moles (319 grams) of water had been separated. The reaction mixture remaining in the esterification still was washed with water and then distilled under vacuum. Six - and - eighty - nine-hundredths moles (2801 grams) of diethylene glycol bis(trichloroacetate) was recovered having the following analysis and characteristics:

| | |
|---|---|
| Per cent chlorine found | 53.3 |
| Per cent chlorine theory | 53.7 |
| Refractive index at 20° C | 1.4908 |
| Boiling range at between 4 and 7 mm. Hg °C | 184–199 |
| Specific gravity at 24° C | 1.5448 |
| Appearance, Water white oily liquid. | |

*Example IV.—Propylene glycol-1,2-bis-(trichloroacetate)*

In a manner after the foregoing examples, 8.03 moles (1213 grams) of trichloroacetic acid together with 4.18 moles (318 grams) of propylene glycol-1,2 and 300 grams of toluene were charged into an esterification still and the charge refluxed until the formation of water ceased, which was after 7.77 moles (140 grams) of water had been separated. The reaction mixture remaining in the esterification still was then distilled under vacuum. Three - and - ninety - five-hundredths moles (1452 grams) of propylene glycol-1,2-bis-(trichloroacetate) was recovered having the following analysis and characteristics:

| | |
|---|---|
| Per cent chlorine found | 55.5 |
| Per cent chlorine theory | 58.1 |
| Refractive index at 20° C | 1.4855 |
| Boiling point at 1 mm. Hg °C | 147 |
| Specific gravity at 25° C | 1.5485 |
| Appearance, Water white oily liquid. | |

*Example V.—Butane-diol-1,3-bis-(trichloroacetate)*

In a manner after the foregoing examples, 8.0 moles (1308 grams) of trichloroacetic acid together with 4.2 moles (378 grams) of butane-diol-1,3 and 270 grams of toluene were charged into an esterification still and the charge refluxed until no more water was separated. The organic material was vacuum distilled. The ester product recovered was washed with three separate portions of water, treated with active carbon adsorbent and then filtered to effect a purification and discoloration of the product. Three-and-eighty-seven-hundredths moles of butane-diol-1,3-bis(trichloroacetate) was recovered having the following analysis and characteristics:

| | |
|---|---|
| Per cent chlorine found | 54.5 |
| Per cent chlorine theory | 55.9 |
| Refractive index at 20° C | 1.4830 |
| Boiling range at 1 mm. Hg °C | 142–147 |
| Specific gravity at 25° C | 1.4986 |
| Appearance, Water white oily liquid. | |

*Example VI.—Pentane-diol-2,4-bis-(trichloroacetate)*

In a manner after the foregoing examples, 8.53 moles (1393 grams) of trichloroacetic acid together with 4.18 moles (435 grams) of pentane-diol-2,4 and 150 grams of toluene were charged into an esterification still. The charge was refluxed until no more water was separated which was after 7.9 moles (142 grams) of water had been separated. The remaining reaction mixture was vacuum distilled. Four-and-five-hundredths moles (1600 grams) of pentane-diol-2,4-bis(trichloroacetate) was recovered having the following analysis and characteristics:

| | |
|---|---|
| Per cent chlorine found | 53.17 |
| Per cent chlorine theory | 53.9 |
| Refractive index at 20° C | 1.4800 |
| Boiling range at 1 mm °C | 133–149 |
| Specific gravity at 25° C | 1.4523 |
| Appearance, Water white oily liquid. | |

*Example VII.*—Hexane - diol - 2,5 - bis(trichloroacetate)

In a manner after the foregoing example, 8.0 moles (1200 grams) of trichloroacetic acid together with 3.19 moles (460 grams) of hexanediol-2,5 and 260 grams of toluene were charged into an esterification still. The charge was refluxed until no more water was separated which was after 7.77 moles (140 grams) of water had been separated. The remaining reaction mixture was vacuum distilled. Three-and-twenty-seven-hundredths moles (1338 grams) of hexanediol-2,5-bis(trichloroacetate) was recovered having the following analysis and characteristics:

| | |
|---|---|
| Per cent chlorine found | 51.20 |
| Per cent chlorine theory | 52.1 |
| Refractive index at 20° C | 1.4787 |
| Boiling range at 1 mm. Hg °C | 169 |
| Specific gravity at 25° C | 1.4096 |
| Appearance, Water white oily liquid. | |

The foregoing examples illustrate our preferred method for preparing preferred trichloroacetic acid diesters of this invention, from dihydroxy aliphatic alcohols of the type $R(OH)_2$ wherein R is a radical selected from the group $C_nH_{2n}$ and $(C_nH_{2n})_2O$ wherein $n$ is a whole number from two to six, inclusive, however, it is to be understood that we do not wish to be limited thereto because dihydroxy aliphatic alcohols, higher in the glycol series than those of the foregoing formula wherein $n$ is a whole number from two to six, may be successfully used in accordance with this invention to produce valuable trichloroacetic acid diesters.

The compounds of this invention each contain two trichloromethyl groups. These groups make the compounds particularly useful; especially the lower members of the series, as given in the foregoing examples; since they are non-flammable and retard combustion when incorporated into resins; e. g. cellulose resins, such as cellulose acetate and cellulose ethers; in which they also serve the dual purpose of plasticizing such resins. In addition, the novel esters are useful as plasticizers for vinyl resins, e. g. vinyl halides, vinyl esters and vinyl acetals. However, we have determined that the esters of this invention evolve HCl at a very slow rate on standing. This characteristic would render them undesirable for use as plasticizers in synthetic resins, except that we have found that the stability of these esters, against decomposition resulting from aging or exposure to heat whereby hydrogen chloride is split off, may be vastly improved by incorporating therein a stabilizing amount of an alkene oxide. For example, by incorporating between about one-half and one per cent of propylene oxide, or preferably a higher boiling alkene oxide stabilizer, such as, phenoxy propylene oxide or polymeric epoxides, into the compounds of this invention, there is no detectable evolution of hydrogen chloride from such a stabilized sample which has been standing more than three months in a glass bottle stored under normal room conditions. Moreover, hydrogen chloride evolution during milling, etc., in connection with incorporating the stabilized plasticizers into resins, is eliminated, with the resulting resin being flameproof, plasticized and generally more stable. The unstabilized compounds of this invention have also found utility as herbicides, and are particularly suitable for this purpose since they are substantially non-volatile under atmospheric conditions and insoluble in water, particularly as compared to the sodium salt of trichloroacetic acid which is a known herbicide, and when applied for such purpose will not evaporate, or be dissolved and thereby removed by rainfall.

The following examples further illustrate the use of the compounds of this invention as plasticizers for resins.

*Example VIII*

Forty parts of ethylene glycol bis(trichloroacetate) which had been given a preliminary stabilizing treatment by washing with an aqueous solution of sodium bicarbonate, 100 parts of cellulose acetate powder and four-tenths part of phenoxy propylene oxide, a high boiling alkene oxide stabilizer, were mixed and milled on a rolling mill, at a temperature of about 160 degrees centrigrade, for about five minutes. The resulting sheet of resin was about one-sixteenth of an inch thick, and was clear, colorless and pliable; however, it could be pulverized into a molding powder, which powder could, in turn, be pressure molded at a temperature of about 160 degrees centrigrade to produce a substantially solid stable colorless resin of any desired moldable shape. A sample of the sheet of resin produced by milling was tested for heat stability by an accelerated aging test which established that cellulose acetate plasticized with stabilized ethylene glycol bis(trichloroacetate) remains unchanged in color when heated one hour at a temperature of 160 degrees centigrade and that on heating for two hours at 160 degrees centigrade, a pale faint yellow color develops.

*Example IX*

Forty parts of diethylene glycol bis(trichloroacetate) which had been given a preliminary stabilizing treatment by washing with an aqueous solution of sodium bicarbonate, 100 parts of cellulose acetate powder and four-tenths part of phenoxy propylene oxide, a high boiling alkene oxide stabilizer, were mixed, and milled on a rolling mill, at a temperature of about 160 degrees centrigrade, for about five minutes. The resulting sheet of resin was about one-sixteenth of an inch thick, and was clear, colorless, and pliable; however, it could be pulverized into a molding powder, which powder could, in turn, be pressure molded at a temperature of about 160 degrees centigrade to produce a substantially solid stable colorless resin of any desired moldable shape. A sample of the sheet of resin produced by milling was tested for heat stability by an accelerated aging test which established that cellulose acetate plasticized with stabilized diethylene glycol bis(trichloroacetate) remains unchanged in color when heated one hour at a temperature of 160 degrees centigrade and that on heating for two hours at 160 degrees centigrade, a pale faint yellow color develops.

The last two preceding examples illustrate the use of the compounds of this invention as plasticizers for synthetic resins; however, we do not intend that our invention shall be limited thereto, as we contemplate still other uses for our novel compounds and compositions or formulations thereof, including use as fungicides, insecticides, fumigants, seed sterilization agents plant hormones, and as rubber accelerators.

We claim:

1. Trichloroacetic acid diesters of dihydroxy acyclic aliphatic alcohols.
2. Trichloroacetic acid diesters of dihydroxy aliphatic alcohols selected from the group consisting of alkylene glycols and alkylene glycol ethers, wherein the number of carbon atoms contained in the alkylene group is from two to six, inclusive.
3. Ethylene glycol bis(trichloroacetate).
4. Diethylene glycol bis(trichloroacetate).
5. Propylene glycol-1,2-bis(trichloroacetate).
6. Butane-diol-1,3-bis(trichloroacetate).
7. Hexane-diol-2,5-bis(trichloroacetate).

JOSEPH A. SONIA.
ERIC H. SCREMIN.

REFERENCES CITED

The following references are of record in the file of this patent:

UNITED STATES PATENTS

| Number | Name | Date |
|---|---|---|
| 2,272,400 | Borglin | Feb. 10, 1942 |

OTHER REFERENCES

Whitemore: "Organic Chemistry," (Van Nostrand Co., New York, 1951), 2nd edition, p. 523.

Scattergood et al.: J. Am. Chem. Soc., vol. 72 pp. 2808–2809 (June 1950).

Karrer: "Organic Chemistry" 2nd English ed. (Elsevier Publ. Co.; New York; 1946), p. 622.